Oct. 5, 1965 J. D. MITCHELL ETAL 3,209,604
TRACTOR DRIVE ATTACHMENT
Filed Sept. 25, 1962 2 Sheets-Sheet 1

Oct. 5, 1965   J. D. MITCHELL ETAL   3,209,604
TRACTOR DRIVE ATTACHMENT
Filed Sept. 25, 1962   2 Sheets-Sheet 2

3,209,604
TRACTOR DRIVE ATTACHMENT

John D. Mitchell, Woodville, N.C.; Paul M. Page, Clarkton, N.C.; and Stuart Wood, 507 Forest Acres Drive, Tarboro, N.C.
Filed Sept. 25, 1962, Ser. No. 225,994
2 Claims. (Cl. 74—15.63)

This invention generally relates to a new and useful attachment for tractors which will enable them to travel at very slow speeds. More particularly, this invention relates to a new and useful attachment for a tractor-tobacco harvester combination or other machinery combinations which will permit the tractor to proceed at a slow enough speed so as to enable workers on the tobacco harvesting machine or other machinery to have ample time to carry out their harvesting, planting or other operations.

Since tobacco ripens rather rapidly it is necessary to harvest the ripened tobacco leaves in a comparatively short time in order to obtain a crop of the highest quality. The same applies for many other fruits and vegetables. In order to facilitate harvesting of ripened tobacco, vegetables, fruit and the like prior art workers have suggested a number of different types of harvesters. Most of these harvesters comprise a wheeled platform type of device which may be drawn at a slow speed through a field and a number of workmen sitting at various positions on the harvester prime and cut the ripe tobacco leaves, or pick the vegetables, fruit and the like. Transplanters are quite similar in many respects to harvesters.

Although there are some harvesters and transplanters that are driven by their own self-contained motor (e.g. Patent No. 2,704,158) many of the harvesters and transplanters in use today are designed to be pulled behind a tractor. However, one problem which frequently arises with tractor-drawn harvesting and transplanting units is that the slowest speed at which the tractor is designed to move is still too fast a speed to effectively and efficiently carry out many harvesting and transplanting operations. It appears that the reason for this is that the tractor manufacturers in years past did not contemplate that their tractors would be used to pull harvesting and transplanting units and therefore did not provide the proper gearing to permit such very slow speeds. Some of the newer tractors on the market have remedied this prior difficulty by providing internal gearing arrangements which will permit very slow tractor speeds. However, the number of these new type tractors is comparatively small and the majority of farmers are faced with the problem of using their old style tractors to pull harvester and transplanter units. Some tobacco farmers use a "stop and start" technique in an attempt to properly coordinate the speed of the tractor with the harvesting or transplanting operations but such procedures are not very effective.

It is therefore a primary object of this invention to provide a power transmission attachment means for tractors which will permit the speed of a tractor to be lowered sufficiently so that it can suitably pull behind it (or in some cases push in front of it) a harvesting or transplanting unit.

A further object of the invention is to provide a power transmission means for a tractor which will permit power to be transmitted from the generator, fan or crank shaft through the power take-off unit to the rear wheel drive.

These and other objects and advantages will become more apparent after reading the attached description in conjunction with the attached drawings wherein.

Figure 1:
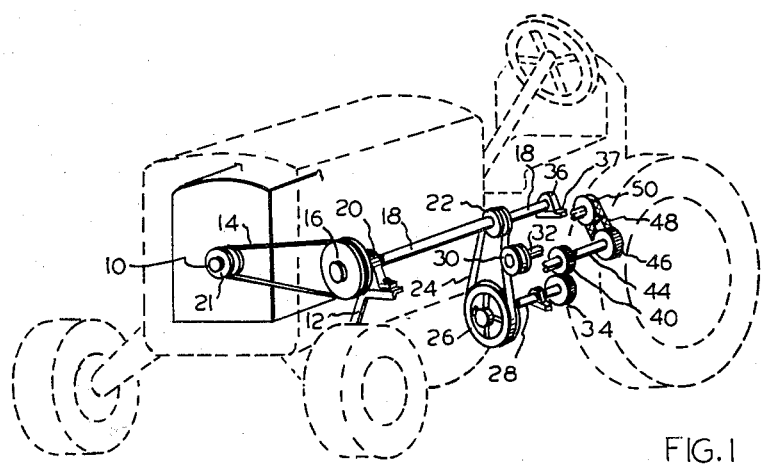
FIGURE 1 is a fragmentary perspective view of the novel combination of power transmission components in accordance with this invention, such combination being shown disposed in relation to a tractor drawn in phantom.
Figure 3:
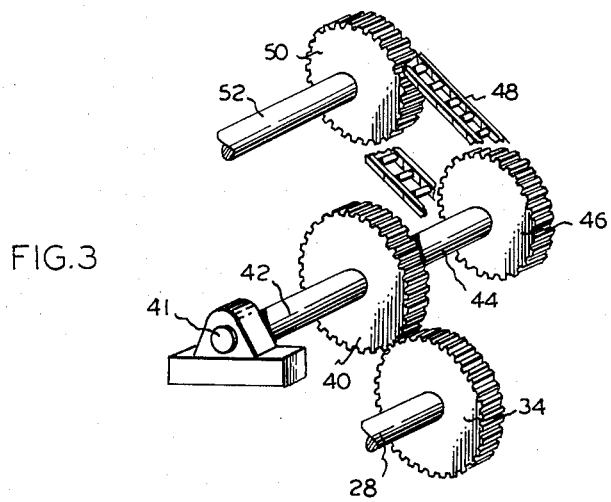
FIGURE 3 is an enlarged fragmentary perspective view of the rear portion of the power transmitting arrangement shown in FIGURE 1.
Figure 4:
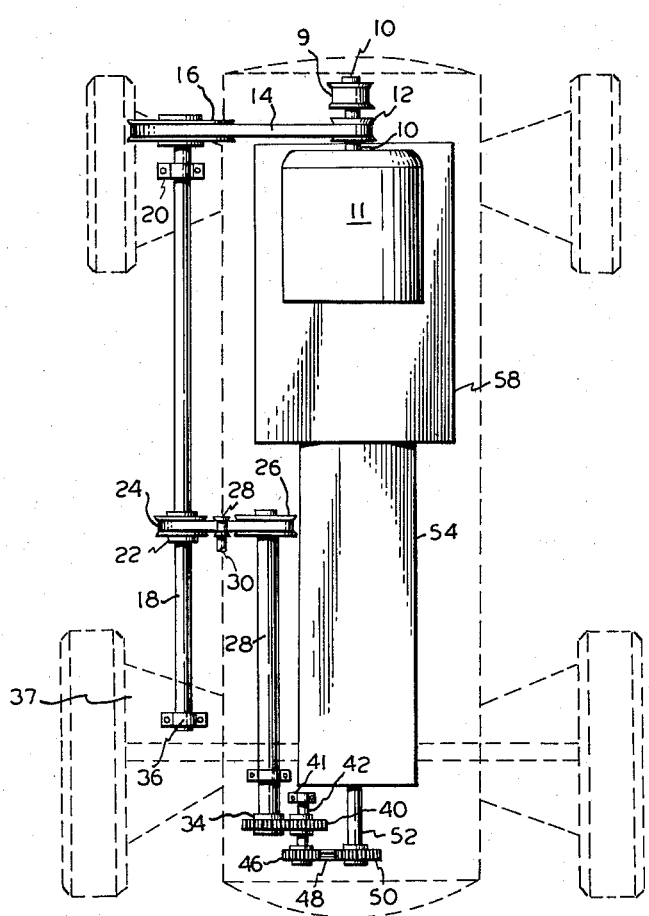
FIGURE 4 is a plan view of the power transmitting combination of components shown in FIGURE 1 in relation to a tractor shown in phantom.

Referring now more specifically to the drawings, 10 is intended to represent the shaft of the generator 11 which is mounted on or closely adjacent to the engine of a tractor. In FIGURE 4 the generator 11 is shown in a rather disproportionately large size for purposes of clarity of illustration and explanation. The shaft 10 is shown in FIGURE 4 as having two pulleys mounted thereon. The front pulley 9 is adapted to receive an engine pulley belt (not shown) which is interconnected to another pulley (not shown) on the engine drive shaft. This engine pulley belt and pulley 9 therefore drive the generator shaft 10. Pulley 9 has been omitted from FIGURE 1 for purposes of clarity of illustration. The tractor engine may of course be a gasoline or diesel engine. (Those skilled in the art will recognize that the shaft of the tractor fan or the shaft of the water pump or the front end of the engine crankshaft would be substantially equivalent to the shaft of the generator for the purposes of this invention.)

A first pulley 12 is mounted on generator shaft 10 and a first pulley belt 14 engaging pulley 12 also engages a second pulley 16 located laterally to one side of the engine portion of the tractor. Pulley 16 is mounted on the forward end of a first elongated power transmission shaft 18. Shaft 18 is supported in an essentially horizontal position and approximately parallel to the ground by means of a forward mounting bracket 20 located on a portion of a tractor frame member 21 and a rear mounting bracket 36 mounted on a portion of the rear tractor frame member 37. A third pulley 22 is mounted intermediate the ends of shaft 18 and a second pulley belt 24 which engages the pulley 22 is also adapted to engage a fourth pulley 26 located therebelow. An idler or engagement wheel 30, mounted on shaft 32, is designed to alternately move in the directions indicated by arrows A and B (see FIGURE 2). In other words the shaft 32 is joined to handle 100 and handle arm 102 through handle extension 104. The tractor operator by moving handle 100 to the right or left can cause handle extension 104, shaft 32 and wheel 30 to pivot about point 106 and move in direcitons A or B. When wheel 30 moves in direction A no pressure is against pulley belt 24 and no power can be transmitted from pulley 22 to pulley 26. When wheel 30 moves in direction B, pressure is applied against belt 24 so that it tightens around pulleys 22 and 26 so that power may be transmitted therebetween.

Pulley 26 is mounted upon a second power transmission shaft 28 and the rearward end of this shaft 28 is fitted with a first toothed gear wheel 34. Toothed gear wheel is designed to operatively engage and interconnect a second toothed gear wheel 40 that is located intermediate the ends of a third power transmission shaft 42–44. The front end of shaft 42–44 is secured within a mounting bracket 41 also located on a frame portion of the rear of the tractor. The rearward end of shaft 42–44 is fitted with a first sprocket 46 and the sprocket chain 48 which engages sprocket 46 also passes around a second sprocket 50. The sprocket 50 is mounted on the rear end of power transmission shaft 52 and this shaft 52 can be considered as corresponding to the power take-off shaft on a conventional power take-off unit.

Since both the mechanical construction of power take-off units and power take-off systems and the operative relationship of such units and systems with the other parts of the tractor (such as the engine, drive shaft, clutch, etc.) are well known for any given tractor, details thereof are not presented in the drawings. Likewise, since said mechanical constructions and said operative relationships form no part of the novelty of this invention a specific description thereof will not be provided here. Every tractor manufacturer will provide this information upon request and a number of publications carry such details (e.g. see the Redbook Farm Equipment issue of the "Implement and Tractor" magazine, vol. 77, No. 3, January 25, 1962, pages 74, 76—as well as similar earlier annual issues). In view of the fact that both the mechanical construction of power take-off units and the operative relationship of such units to the other parts of the tractor are well known for any given tractor, the two schematic types of rectangular boxes 54 and 58 have been used in FIGURE 4. Box 54 symbolically represents all of the gearing of a tractor connected with power transmission and box 58 symbolically represents the engine.

Under ordinary tractor driving conditions, when the tractor operator desires to travel within the range of speeds which is built into the gearing arrangement of the tractor itself at the time of manufacture, the pulley belt 24 and the pulleys 22 and 26 will be essentially disengaged or inoperative. Under these conditions no power will be transmitted through the arrangement shown to the power take-off shaft 52. In other words the idler or engagement wheel 30 will preferably have been moved far enough in the direction indicated by arrow A so that the pulley belt 24 will not be pressed sufficiently tightly against pulleys 22 and 26 to cause operative engagement therebetween.

Figure 2:
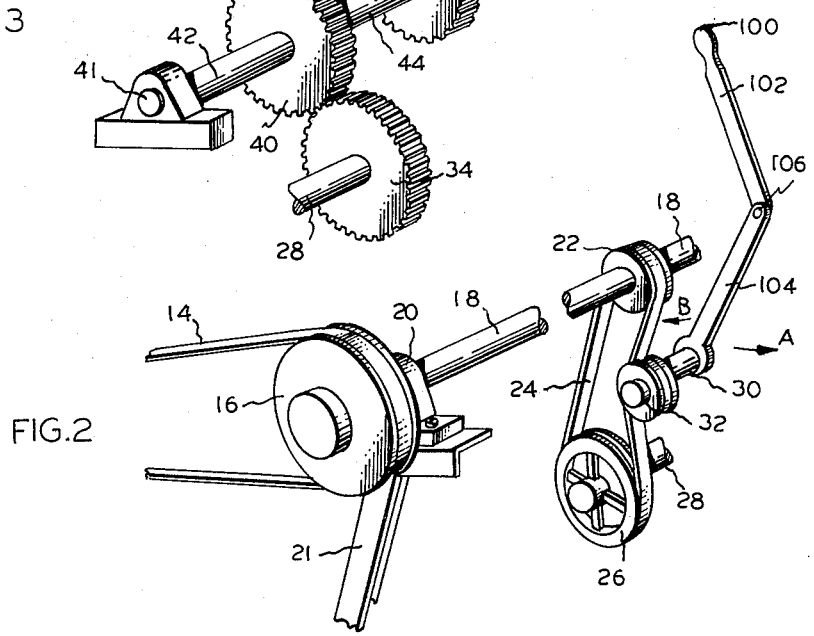
FIGURE 2 is an enlarged fragmentary perspective view of the front portion of the power transmitting arrangement shown in FIGURE 1.

However, when it is desired to operate at a speed lower than that which the tractor is normally designed to run, this invention provides a roundabout or "backdoor" system whereby the operator can cause the rear wheels of the tractor to move at a very slow speed. More specifically, when the driver of the tractor wishes to travel at a very slow speed he first of all fixes his clutch in a "disengaged" position. In this disengaged position no power will be transmitted from the engine 58 rearwardly to the tractor wheels. To get the tractor moving, the driver then moves the idler pulley 30 to the left (as seen in FIGURE 2) in the direction indicated by arrow B so that the idler wheel 30 will bear inwardly against pulley belt 24 so that belt 24 will operatively engage both pulleys 22 and 26 and such engagement will mean that the rotation power of shaft 18 will be transmitted from generator shaft 10, through pulley belt 14 to shaft 18, then through pulley belt 24 to shaft 28, then through gear 34 to gear 40 and finally through gear 46 to gear 50. When gear 50 rotates it will in turn rotate the power take-off shaft 52 and power take-off shaft 52 in turn transmits power through the power transmission system of the tractor to the rear wheels of the tractor. The gear shift of the tractor can also be moved in order to achieve some regulation of the speed. The accelerator is a further means of control.

It will thus be seen that by moving the idler wheel 30 in the direction indicated by arrow B the tractor operator is able to move into a range of very low speeds for the tractor. As noted earlier a slow range of speeds is quite necessary if the tractor is to pull a harvester behind it. Moving idler wheel 30 in the direction of arrow A will of course disengage the low speed gear train arrangement of this invention.

Figure 5:
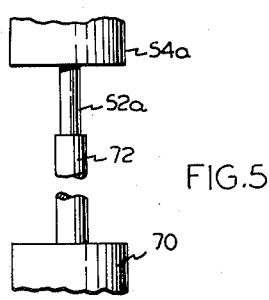
FIGURE 5 is a fragmentary plan view illustrating another embodiment of the invention.

Another embodiment of the invention is illustrated in FIGURE 5, wherein 54a represents the housing for all of the gearing of a tractor that is connected with power transmission, and 52a represents the power take-off shaft of a tractor. In accordance with this embodiment the rear portion of power take-off shaft 52a is operatively joined to the forward end of connecting means 72 and the rear end of connecting means 72 is joined to a power source 70 (such as a small engine or electrical motor). When the power source 70 is activated it will transmit power through connecting means 72 to power take-off shaft 52a and cause take-off shaft 52a to rotate. When power take-off shaft 52a is so rotated, power is transmitted "backwardly" through the power take-off system to the gears in housing 54a which interconnect it with the tractor wheel drive system, and as a result power is ultimately transmitted to the tractor wheels. (Again, since the details of the mechanical construction and operative relationship of the power take-off system and the tractor drive system are well known and form no part of the novelty of this invention, a specific description or illustration thereof has been omitted, it being sufficient to say that when the described hook-up of elements 70, 72, 52a and 54a does occur, the tractor will be driven at a slow speed, e.g., ⅓–⅛ miles per hour.)

When using the embodiment shown in FIGURE 5, the tractor engine is inoperative since all of the motive power for moving the wheels will be supplied by power source 70. Not using the tractor engine has the advantage that it minimizes the chance of wear and damage to the main thrust bearing of the tractor. Power source 70 can be a small gasoline engine of nearly any type (or even an electrically operated motor) and need only have 1–4 H.P. The power source 70 can be mounted on the rear of the tractor but preferably on an implement or other machine being towed by or which is attached to the tractor. The connecting means 72 is shown in the form of a simple shaft connected to shaft 52a, but it will be appreciated that no invention would be involved in utilizing sprockets, gears, belts, or the like in place of or in conjunction with shaft 72. If the power source 70 is mounted on a unit that is being towed by or which is attached to the tractor, the desirability of choosing a connecting means 72 which is operatively extensible and/or operatively movable through any desired range of angles will be apparent (e.g. of the well-known universal type). Also, while the connecting means 72 is shown in a very simplified (almost diagrammatic) form no invention would be involved in using a more sophisticated arrangement which might include non-axially aligned power shafts (e.g. when the power source 70 would be located considerably above or below the level of power take-off shaft 52a).

Tractors which are especially benefited by the teachings of this invention would include tractors manufactured by International Harvester and Allis-Chalmers prior to 1960.

Although the specific embodiment shown in the drawings involves the use of pulleys, belts, chains, sprockets and toothed gear wheels, those skilled in the art will appreciate that various changes and substitutions can be made for these elements in order to carry out the same functions without departing from the true intent and scope of the invention. It would also be obvious to make certain consolidations of elements if desired. Also, it is immaterial whether the disclosed gearing and power transmission arrangement are on the right or left hand side of the tractor.

In conclusion, while there has been illustrated and described a preferred embodiment of our invention, it is to be understood that since the various details of construction may obviously be varied considerably without really departing from the basic principles and teachings of this invention, we do not limit ourselves to the precise constructions herein disclosed and the right is specifically reserved to encompass all changes and modifications coming within the scope of the invention as defined in the appended claims.

What is claimed is:

1. In the known combination of a tractor and a harvesting unit, transplanter unit or the like associated with said tractor, said tractor including an engine, a generator driven by said tractor engine and a power take-off unit operatively associated with the rear of the tractor engine, the improvement which comprises:

(a) a first pulley mounted on the shaft of said generator, (b) a first pulley belt operatively engaging and interconnecting the outer surface of said first pulley and the outer surface of a second pulley, (c) said second pulley being mounted on the forward end of a first elongated power transmission shaft, (d) said first elongated power transmission shaft being mounted horizontally above the ground and laterally offset from said tractor engine by two mounting brackets engaging adjacent opposite ends of said shaft and attached to spaced apart portions of said tractor frame, (e) a third pulley being mounted on said first elongated power transmission shaft rearwardly of said first pulley, (f) a second pulley belt operatively engaging and interconnecting the outer surface of said third pulley and the outer surface of a fourth pulley, (g) said fourth pulley being mounted on the forward end of a second power transmission shaft, (h) said second power transmission shaft being disposed parallel to but below said first power transmission shaft, (i) a first toothed gear wheel located on the rearward end of said second power transmission shaft, (j) said first toothed gear wheel operatively engaging a second toothed gear wheel located intermediate the ends of a third power transmission shaft, (k) said third power transmission shaft being disposed parallel to and above said second power transmission shaft, (l) a first sprocket located on the rearward end of said third power transmission shaft, (m) a sprocket chain operatively engaging and interconnecting the outer surface of said first sprocket and the outer surface of a second sprocket, (n) said second sprocket being mounted on a power take-off shaft that is connected to said power take-off unit, and (o) means for engaging and disengaging said second pulley belt from said third and fourth pulleys.

2. A device according to claim 1 wherein said means for engaging and disengaging said second pulley belt from said third and fourth pulleys comprises an idler wheel that is pivotally mounted so that it can be moved into and out of pressure bearing relationship with said second pulley belt so as to alternately cause operative engagement and disengagement of said third and fourth pulleys.

References Cited by the Examiner

UNITED STATES PATENTS

| | | | |
|---|---|---|---|
| 2,290,835 | 7/42 | Lorimor | 74—15.84 |
| 2,397,613 | 4/46 | Madsen et al. | 180—14 |
| 2,595,336 | 5/52 | Corsentino | 180—53 |
| 2,618,979 | 11/52 | Benning | 74—15.4 |
| 2,795,286 | 6/57 | Lehman | 74—15.63 X |
| 2,810,293 | 10/57 | George et al. | 74—15.88 |
| 2,923,171 | 2/60 | Zedrzykowski | 74—664 |

BROUGHTON G. DURHAM, *Primary Examiner.*